No. 643,138.   O. H. JEWELL.   Patented Feb. 13, 1900.
STRAINER FOR FILTERS.
(Application filed Sept. 27, 1897.)

(No Model.)   2 Sheets—Sheet 1.

Witnesses   Inventor
Wm. M. Rheem   Omar H. Jewell
Wm. F. Hanning   By Bond, Adams, Pickard & Jackson.
   Att'ys No. 643,138. Patented Feb. 13, 1900.
O. H. JEWELL.
STRAINER FOR FILTERS.
(Application filed Sept. 27, 1897.)

(No Model.) 2 Sheets—Sheet 2.

Witnesses. Inventor
Wm. M. Rheem. Omar H. Jewell.
Wm. F. Henning. By Bond Adams Pickard Jackson.
Att'ys

THE NORRIS PETERS CO., PHOTO-LITHO., WASHINGTON, D. C.

UNITED STATES PATENT OFFICE.

OMAR H. JEWELL, OF CHICAGO, ILLINOIS, ASSIGNOR TO THE O. H. JEWELL FILTER COMPANY, OF SAME PLACE.

STRAINER FOR FILTERS.

SPECIFICATION forming part of Letters Patent No. 643,138, dated February 13, 1900.

Application filed September 27, 1897. Serial No. 653,095. (No model.)

*To all whom it may concern:*

Be it known that I, OMAR H. JEWELL, a citizen of the United States, residing at Chicago, in the county of Cook and State of Illinois, have invented certain new and useful Improvements in Filters, of which the following is a specification, reference being had to the accompanying drawings.

My invention relates to filters, and has for its object to provide certain improvements in filters of the general type illustrated and described in my Patent No. 572,605, dated December 8, 1896, such improvements relating more particularly to the construction of the screens and screen system. In my said patent I have shown and described a construction by which the necessity of using stirrers or agitators is avoided, the necessary agitation of the granular filter-bed being secured by reversing the flow of water, causing it to rise uniformly through the bed, thus loosening the granular material and permitting the impurities accumulated in it to be carried out with the overflowing water.

The chief object of my present invention is to improve the prior construction and provide a new and improved filter wherein the use of the deflectors above referred to is avoided and the wash-water is discharged uniformly throughout the filter-bed in jets or jet-like streams moving in an upward direction and serving to loosen and agitate the granular material and effect a thorough purification of the filter-bed. This object is accomplished in the manner and by the means hereinafter described and claimed, reference being had to the accompanying drawings, in which—

Figure 1:
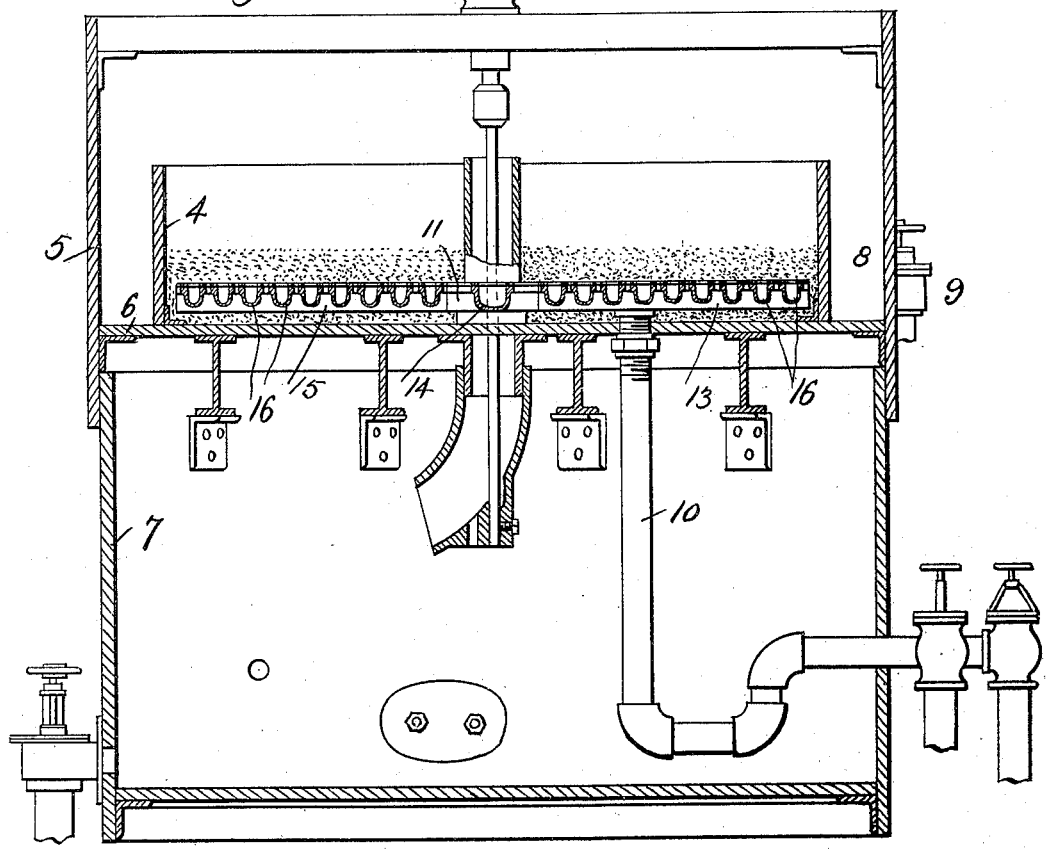
Figure 2:
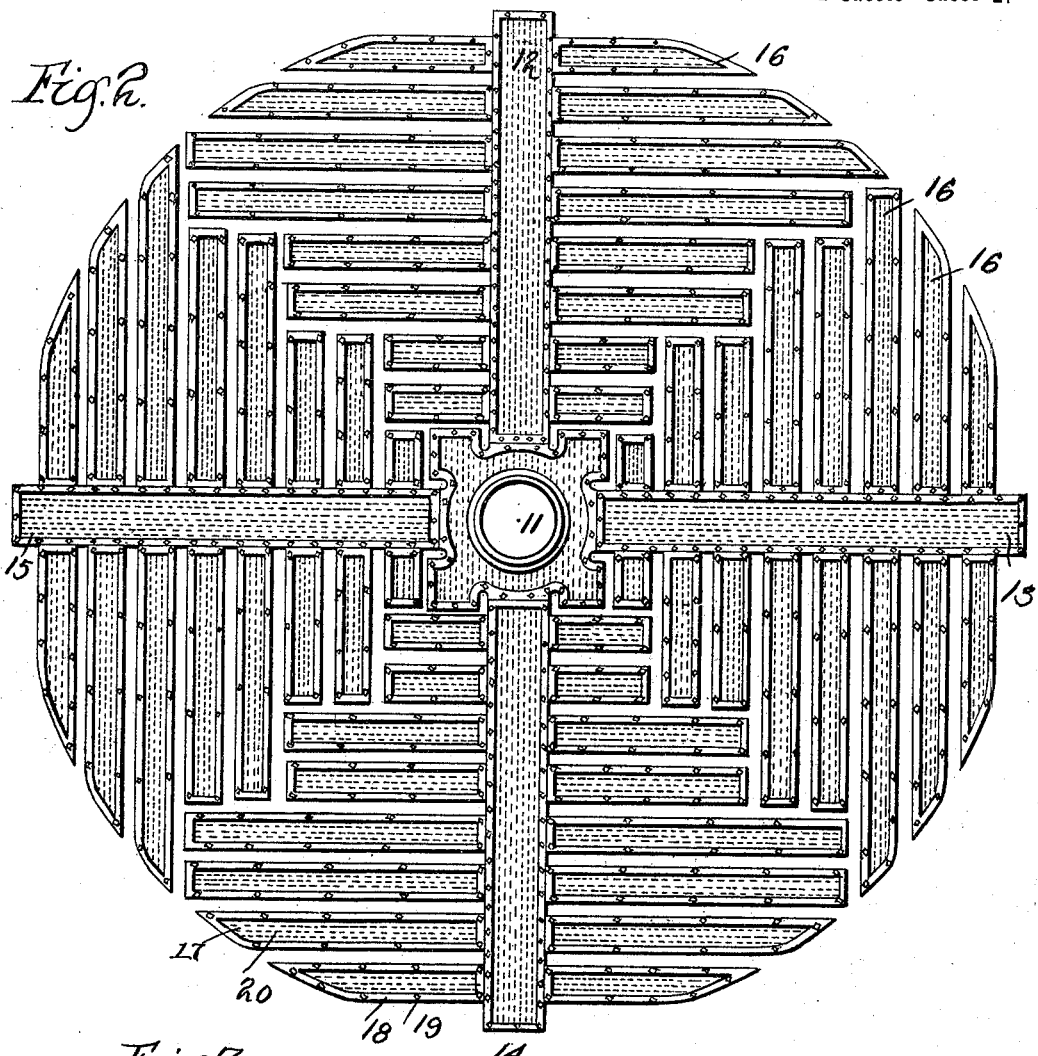
Figure 3:
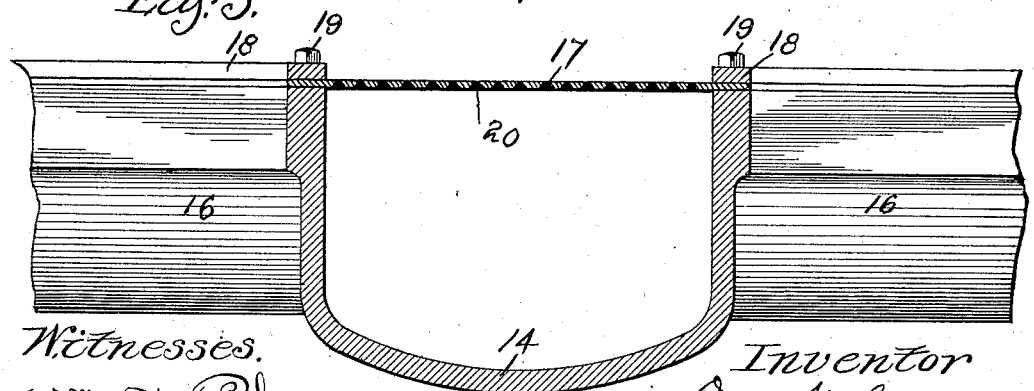

Figure 1 is a vertical section of a filter. Fig. 2 is a plan view of the strainer system, and Fig. 3 is a vertical section showing the construction of one of the strainer-plates and the manner in which it is secured to the strainer-pipe.

In the drawings, 4 indicates a filter-tank which is supported in a suitable tank 5, having a floor 6, upon which the filter-tank 4 rests.

7 indicates a settling-tank arranged below the filter-tank 4.

As shown in Fig. 1, the filter-tank 4 is somewhat smaller in diameter than the tank 5, the object of which is to provide for washing the filter-bed for washing purposes, the water being caused to rise in the tank 4 until it overflows into the tank 5, from which it is carried off through a discharge-passage 8, communicating with a wash-water pipe 9.

10 indicates a pipe through which the pure water is discharged from the filter-tank 4 and through which the wash-water is introduced into said tank.

The pure-water pipe 10 communicates with a strainer system arranged in the bottom of the filter-tank 4, as indicated in Fig. 1, said strainer system consisting of a central portion or hub 11, having radial arms 12 13 14 15, each of said arms having branches 16 arranged perpendicularly thereto, as shown in Fig. 2. It will be noted that the area of the different strainer-pipes 12 13 14 15, with their respective branches, is about equal, each covering substantially one-fourth of the bottom of the filter-tank. As illustrated in Figs. 1 and 3, the radial pipes 12 13 14 15 and the branch pipes 16 are all substantially U-shaped and have secured upon them strainer-plates 17, as shown in Fig. 3. The strainer-plates 17 have their edges secured upon the edges of the different pipes by retaining-strips 18, the edges of said strainer-plates being secured between said retaining-strips 18 and the upper edges of the pipes. The retaining-strips 18 are held in place by bolts 19, as illustrated. As shown in Fig. 3, the strainer-plates 17 are provided with longitudinal slits 20, which are of inverted-V shape, so that narrow openings are formed on the upper sides of said plates, thus preventing clogging of the slits by the granular material reposing in the filter-bed or by impurities which pass through the bed. Said slits also have the effect of nozzles when the flow of water is reversed in washing the bed and serve to direct the wash-water upward through the bed with considerable velocity, thereby effecting a thorough agitation of the granular material. Furthermore, the strainer-plates being arranged directly upon the strainer-pipes and there being nothing in the way to retard the flow of the wash-water, the full effect of the water-pressure is secured in washing, thereby still further adding to the velocity of the wash-water. The uniform distribution of the wash-water throughout the filter-bed is secured by making the slits 20 of uniform area, distributing them uniformly over the strainer system, and making the combined area of such slits substantially equal to that of the pipe 10, by this means the discharge of the wash-water being substantially the same through each of the slits.

That which I claim as my invention, and desire to secure by Letters Patent, is—

1. The combination with a hub, of a plurality of radial strainer-pipes extending in three or more directions therefrom, and branch pipes communicating with said radial pipes, the area of each strainer-pipe with its branches being equal to that of each of the others, substantially as described.

2. The combination with a central discharge-pipe, of a plurality of radial strainer-pipes extending in four directions therefrom, and branch pipes communicating with said radial pipes, said branch pipes being arranged perpendicularly to the radial pipe to which they are respectively attached, substantially as described.

3. In a filter, the combination with a filter-tank, and a discharge-pipe, of a series of strainers arranged in said tank and communicating with said discharge-pipe, said strainers having perforations or slits the combined area of which is substantially equal to the area of the discharge-pipe, substantially as described.

OMAR H. JEWELL.

Witnesses:
J. WM. JEWELL,
JOHN L. JACKSON.